(12) United States Patent
Ballezzi

(10) Patent No.: US 11,000,145 B2
(45) Date of Patent: May 11, 2021

(54) DEVICE FOR BREWING BEVERAGES IN REDUCED TIME BY MEANS OF PHYSICAL MOTION

(71) Applicant: Louis Ballezzi, Philadelphia, PA (US)

(72) Inventor: Louis Ballezzi, Philadelphia, PA (US)

(*) Notice: Subject to any disclaimer, the term of this patent is extended or adjusted under 35 U.S.C. 154(b) by 423 days.

(21) Appl. No.: 15/160,955

(22) Filed: May 20, 2016

(65) Prior Publication Data

US 2017/0332824 A1 Nov. 23, 2017

(51) Int. Cl.
*A47J 31/22* (2006.01)
*A47J 31/44* (2006.01)
*A47J 31/00* (2006.01)

(52) U.S. Cl.
CPC .................................. *A47J 31/002* (2013.01)

(58) Field of Classification Search
CPC .................................. A47J 31/22; A47J 31/44
See application file for complete search history.

(56) References Cited

U.S. PATENT DOCUMENTS

| | | | | |
|---|---|---|---|---|
| 2,459,498 A | * | 1/1949 | Cameron | A47J 31/20 |
| | | | | 126/373.1 |
| 3,654,852 A | * | 4/1972 | Rosan, Sr. | A47J 31/20 |
| | | | | 99/323 |
| 5,150,645 A | * | 9/1992 | Schiettecatte | A47J 31/0663 |
| | | | | 99/295 |
| 9,248,956 B2 | * | 2/2016 | Perentes | B65D 85/8043 |
| 2006/0060589 A1 | * | 3/2006 | Lee | A47J 31/02 |
| | | | | 220/709 |
| 2014/0174965 A1 | * | 6/2014 | Herling | A47J 31/18 |
| | | | | 206/216 |
| 2015/0230493 A1 | * | 8/2015 | Rodriguez Rodriguez | A23F 5/36 |
| | | | | 426/77 |
| 2016/0227959 A1 | * | 8/2016 | Yoon | A47J 31/06 |
| 2017/0127874 A1 | * | 5/2017 | Rivera | A47J 31/4403 |

FOREIGN PATENT DOCUMENTS

| | | | |
|---|---|---|---|
| CN | 202553619 | * | 11/2012 |
| CN | 202698651 | * | 1/2013 |
| CN | 203340931 | * | 12/2013 |
| CN | 203782135 | * | 8/2014 |
| CN | 203985889 | * | 12/2014 |
| EP | 2119383 | * | 11/2009 |
| RU | 2149176 | * | 5/2000 |
| WO | WO9405191 | * | 3/1994 |

OTHER PUBLICATIONS

English Translation for CN203340931 published Dec. 2013.*
English Translation for CN203985889 published Dec. 2014.*
English Translation for RU2149176 published May 2000.*
English Translation forCN202553619 published Nov. 2012.*
English Translation for WO9405191 published Mar. 1994.*
English Translation for EP2119383 published Nov. 2009.*

* cited by examiner

*Primary Examiner* — Anthony J Weier

(57) ABSTRACT

A device to brew beverages or otherwise extract compounds from solids into a liquid solvent, and to decrease the time necessary to accomplish such brewing or extraction, using physical motion. A method to decrease the time necessary to brew a beverage or extract compounds from solids into a liquid solvent without the necessity of adding thermal energy.

5 Claims, 9 Drawing Sheets

DEVICE FOR BREWING BEVERAGES IN REDUCED TIME BY MEANS OF PHYSICAL MOTION

BACKGROUND OF THE INVENTION

The effects of heat on the solubility of various compounds in liquid solvents are well understood. Generally, increasing the temperature of a liquid solvent also increases the solubility of compounds in such solvent. In the context of brewing beverages such as coffee or tea, heat has long been used to hasten the extraction of compounds from the applicable solid (e.g., coffee grounds or tea leaves) by the applicable solvent (i.e., water). Specifically, water used to brew coffee or tea has typically been heated to boiling or near-boiling temperatures to hasten the brewing process.

More recently, it has become popular to use room temperature or cold water in brewing processes. Such so-called "cold-brewing" methods have been applied to both coffee and tea. The beverages resulting from cold-brewing have been characterized as featuring distinct, and frequently preferable, flavor profiles compared to beverages brewed using hot water. It has been noted, for example, that cold-brewed coffee is less acidic than hot-brewed coffee. Such flavor differences between hot- and cold-brewed beverages are presumably due to differences in the relative solubility of various compounds in coffee or tea in water of different temperatures as well as the effect of water temperature on coffee grounds or tea leaves.

While the use of cold or room temperature water as the solvent in a brewing process may lead to a desired decrease in the extraction of certain undesirable compounds from coffee or tea and, correspondingly, drinkers may prefer the flavor of cold-brewed coffee or tea, the use of cold or room temperature water in the brewing process significantly increases the time required for brewing extraction compared to hot water. Typical methods of cold-brewing coffee, for example, call for the steeping of ground coffee in cold or room temperature water for 12 to 24 hours. A method of hastening the brewing process without the application of heat would therefore be beneficial because it would allow the desired flavor of cold-brewed coffee or tea to be achieved in less time than is possible under currently practiced cold-brewing techniques.

The invention disclosed herein constitutes a device, and a method, to cold-brew beverages such as coffee or tea (or otherwise extract compounds from a solid into a liquid solvent) using physical motion (e.g., stirring, mixing, or agitation) in less time than would be required in the absence of such physical motion. Application of physical motion to a cold-brewing system accelerates the extraction process without the addition of thermal energy, allowing the desired flavor profile to be achieved in less time.

SUMMARY OF THE INVENTION

An embodiment of the invention is a device and a method for brewing beverages, such as coffee or tea, or otherwise extracting compounds from a solid into a liquid solvent, using physical motion (e.g., stirring, mixing, or agitation) in less time than would be required in the absence of such physical motion, and without the application of heat to the brewing or extraction process.

Beverages, such as coffee or tea, are commonly brewed by extracting compounds from a solid (e.g., coffee grounds or tea leaves) into a solvent (commonly, water). Common brewing techniques use heated water, often water that is boiling or near-boiling, to facilitate the extraction because the hot water extracts compounds from the solid more quickly than cold or room temperature water. Thus, hot water brewing typically requires minutes to complete, whereas cold or room temperature water brewing typically requires hours. Unfortunately, in addition to the compounds that a brewer may desire to extract from the solid in order to brew the beverage, hot water tends to also extract undesired compounds. In the case of coffee or tea, hot water brews may therefore be characterized by tastes that are more bitter or sharper than cold or room temperature water brews.

In order to avoid the undesired flavors often present in hot-brewed beverages, the present invention uses cold or room temperature water for brewing and uses physical motion to accelerate the extraction process, thereby decreasing the amount of time otherwise required to complete the cold or room temperature brewing extraction.

Embodiments of the invention can incorporate physical motion into the brewing extraction in numerous ways. For example, the brewing solvent can be stirred, either together with the brewing solid or with the brewing solid contained in a porous chamber. Alternatively, the brewing solid can be placed within a porous chamber, which chamber can be spun within the brewing solvent, such that the solvent flows through the brewing solid. Alternatively, the vessel containing the brewing solid and solvent can be spun or tumbled so as to mix the solid and solvent. Further alternatively, the brewing solvent can be circulated through the vessel containing the brewing solid by means of a pump.

Embodiments of the invention may feature a brewing vessel to hold the brewing solid and solvent, which vessel may be made out of a variety of materials, such as glass, plastic, or metal. Such vessel may be fashioned to attach to one or more interchangeable tops or ends, which can add various functions to the vessel. For example, one such interchangeable top may be a non-porous cap that seals the vessel to prevent leaks of the solvent or brewed beverage. Another such interchangeable top may feature a pitched bladed propeller attached to an axel and motor, which spins to stir the brewing solution in the vessel. Another such interchangeable top may feature a spout for pouring the brewed beverage from the vessel. Another such interchangeable top may feature a porous screen attached to a plunger which, when depressed, can filter the brewed solution from the brewing solid, so as to separate the brewed beverage from waste solids of the extraction process. A single interchangeable top may feature one or more of such features.

The interchangeable tops or ends may be affixed to the brewing vessel by a variety of means. For example, each of the vessel and the tops or ends may feature complimentary threading, so as to allow the tops or ends to be screwed onto the vessel. Alternatively, the tops or ends may be sized so as to snap tightly onto the vessel and to be held in place by friction. Alternatively, the tops or ends may be clamped onto the vessel.

DETAILED DESCRIPTION OF THE PREFERRED EMBODIMENTS

The following is a detailed description of multiple embodiments of the disclosed invention, which constitutes a device, and a method, for brewing beverages such as coffee or tea (or otherwise extracting compounds from a solid into a liquid solvent) using physical motion (e.g., stirring, mixing, or agitation) in less time than would be required in the absence of such physical motion.

In an embodiment of the invention, the brewing extraction occurs without the addition of thermal energy (heat), so as to achieve a desired flavor profile in the brewed beverage. In other embodiments, heat may be added to achieve a desired effect on taste, brewing time, or beverage temperature.

Figure 5:
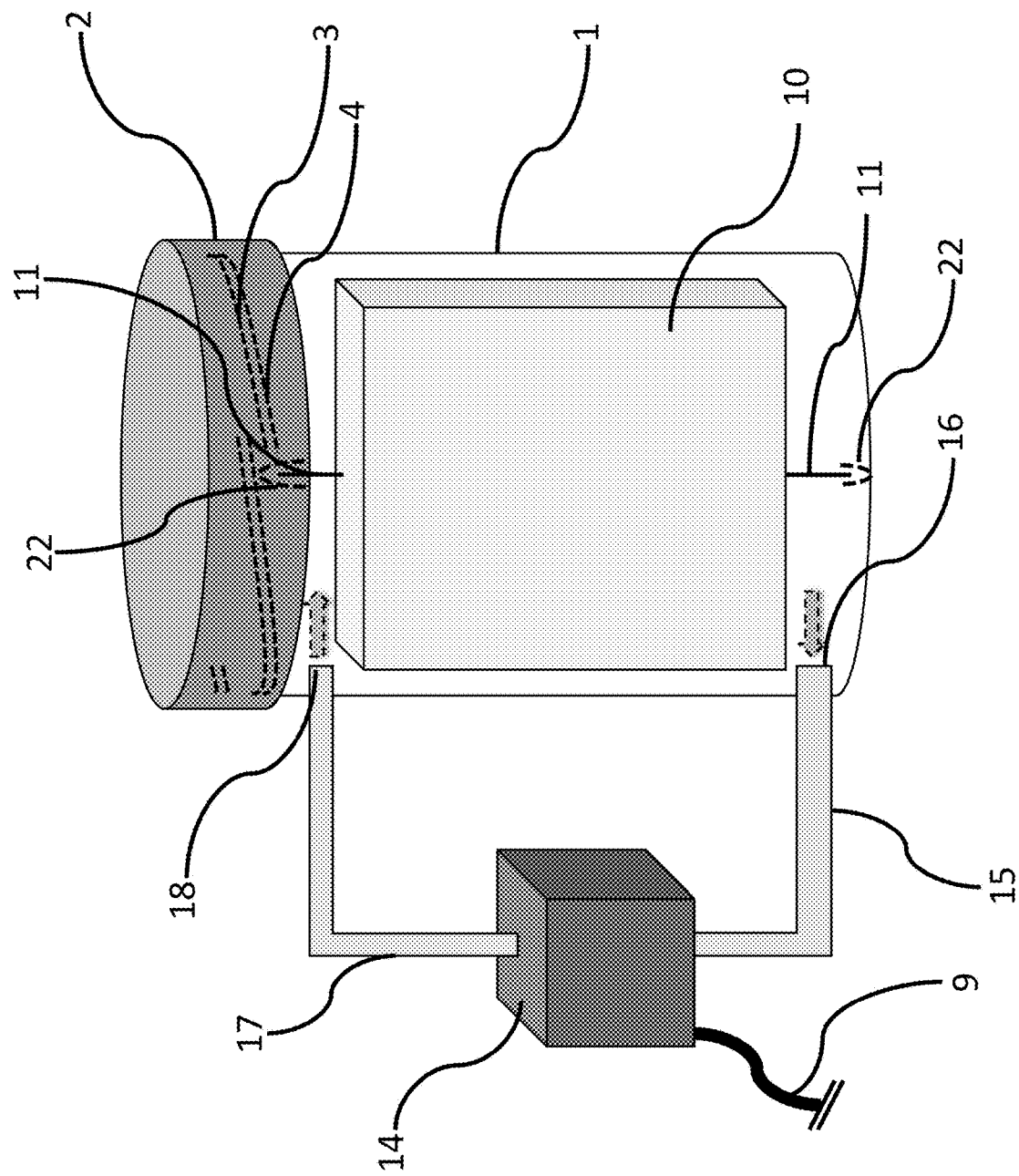
FIG. 5 is a drawing of an alternative embodiment of the invention.
Figure 6:
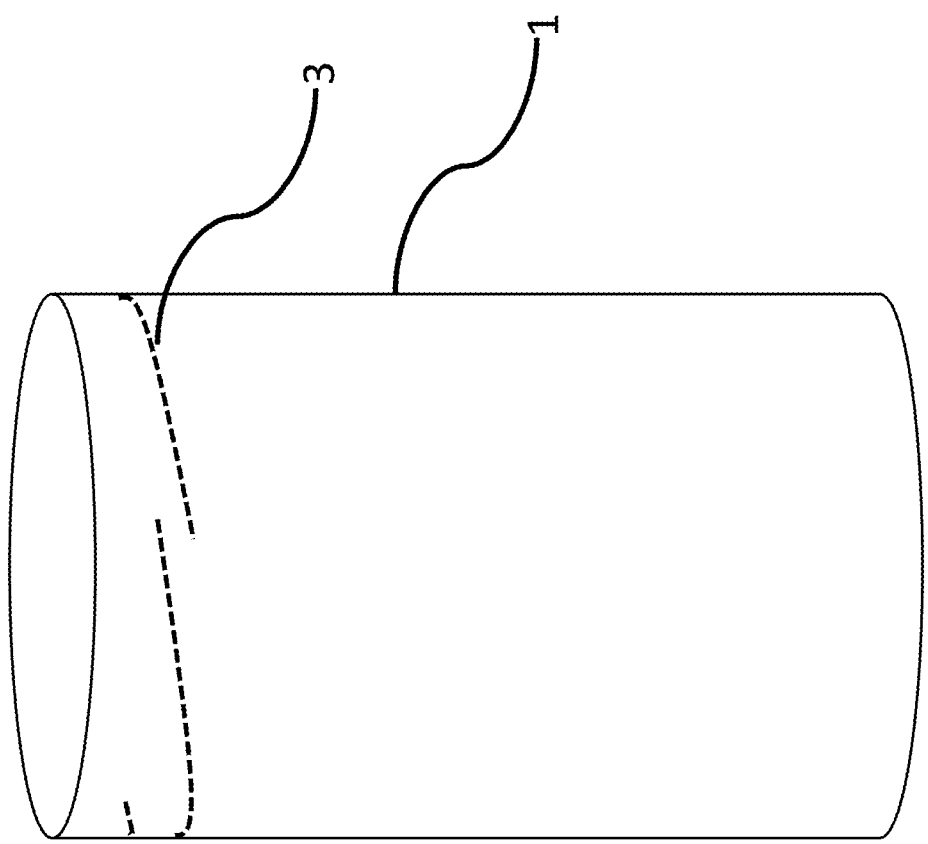
FIG. 6 is a drawing of a portion of an embodiment of the invention, which portion is a vessel to hold brewing solid and solvent.

In an embodiment, the brewing extraction takes place in a vessel, which may be made out of a variety of materials, such as glass, plastic, or metal. FIGS. 1 through 5 show side views of alternative embodiments of the invention, each featuring a brewing vessel 1. FIG. 6 shows a side view of the brewing vessel 1, removed from other elements of the invention. Each of FIGS. 1 through 6 show threaded grooves 3 integrated into the brewing vessel 1. Each of FIGS. 1 through 5 and FIGS. 7 through 9 show a removable top 2, which can be affixed to the brewing vessel 1 and which features threaded grooves 4 that are complementary to the threaded grooves 3 integrated into the brewing vessel 1. In such embodiments, the removable top 2 may be affixed to the brewing vessel 1 by screwing the threaded grooves 3 and 4 together. In alternative embodiments, the brewing vessel 1 may be open on more than one end, and the removable tops 2 may be affixed to one or more of such open ends.

In further embodiments, the removable tops or ends 2 may lack threaded grooves 4 and the brewing vessel 1 may lack threaded grooves 3. In such embodiments, the removable tops or ends 2 may be sized in relation to the open ends of the brewing vessel 1 so that such removable tops or ends 2 can be snapped onto the open ends of the brewing vessel 1 and be held in place by friction.

Figure 1:
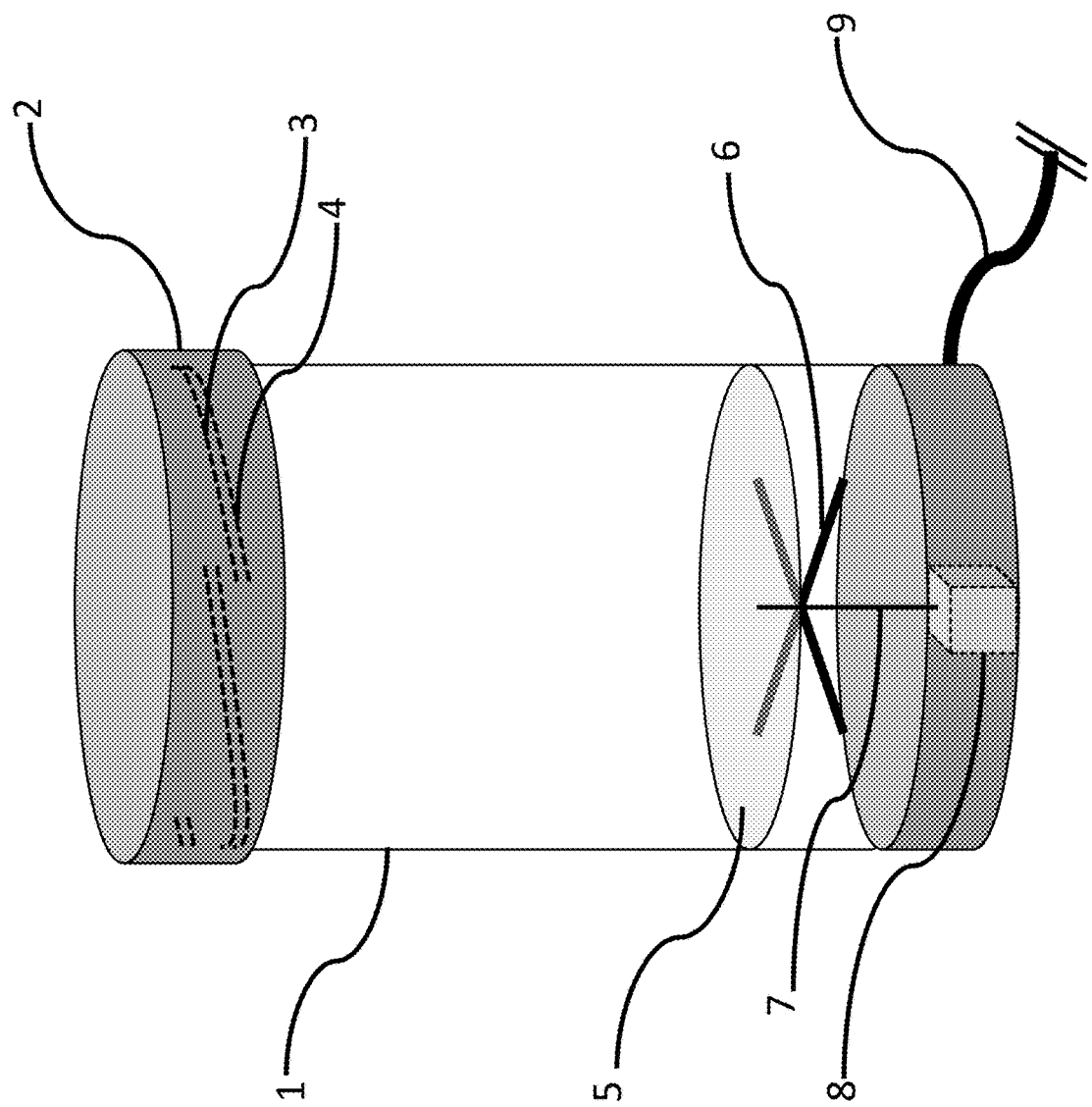
FIG. 1 is a drawing of an embodiment of the invention.

In the embodiment shown in FIG. 1, the base of the brewing vessel 1 contains an electric motor 8, which may be powered by batteries or a wired power source 9. The motor 8 is connected to an axel 7, which is in turn connected to a pitched bladed propeller 6. A porous mesh screen 5 is placed above the pitched bladed propeller 6. The embodiment shown in FIG. 1 is operated as follows: the brewing solid (e.g., coffee grounds or tea leaves) and the brewing solvent (e.g., cold or room temperature water) are poured into the brewing vessel 1 above the porous mesh screen 5. The brewing solvent is able to flow through the porous mesh screen 5, but the brewing solid is not, due to the small size of the pores in the porous mesh screen 5. Thus, the brewing solvent is able to occupy the entire internal volume of the brewing vessel 1, while the brewing solid is able to occupy that portion of the internal volume that is above the porous mesh screen 5. When the motor 8 is activated, the axel 7 and the pitched bladed propeller 6 spin, which circulates the brewing solvent throughout the interior of the brewing vessel 1. The porous mesh screen 5 prevents the brewing solid from coming into contact with the spinning propeller 6, so as to avoid any sheering, grinding, or pulverizing of the brewing solid which could then contaminate the brewed beverage. After the desired brewing time has elapsed, the motor 8 is deactivated and the brewed beverage can be separated from the brewing solid. As illustrated in FIG. 1, the removable top 2 can be screwed onto the brewing vessel 1 during the brewing extraction so as to avoid spillage.

Figure 2:
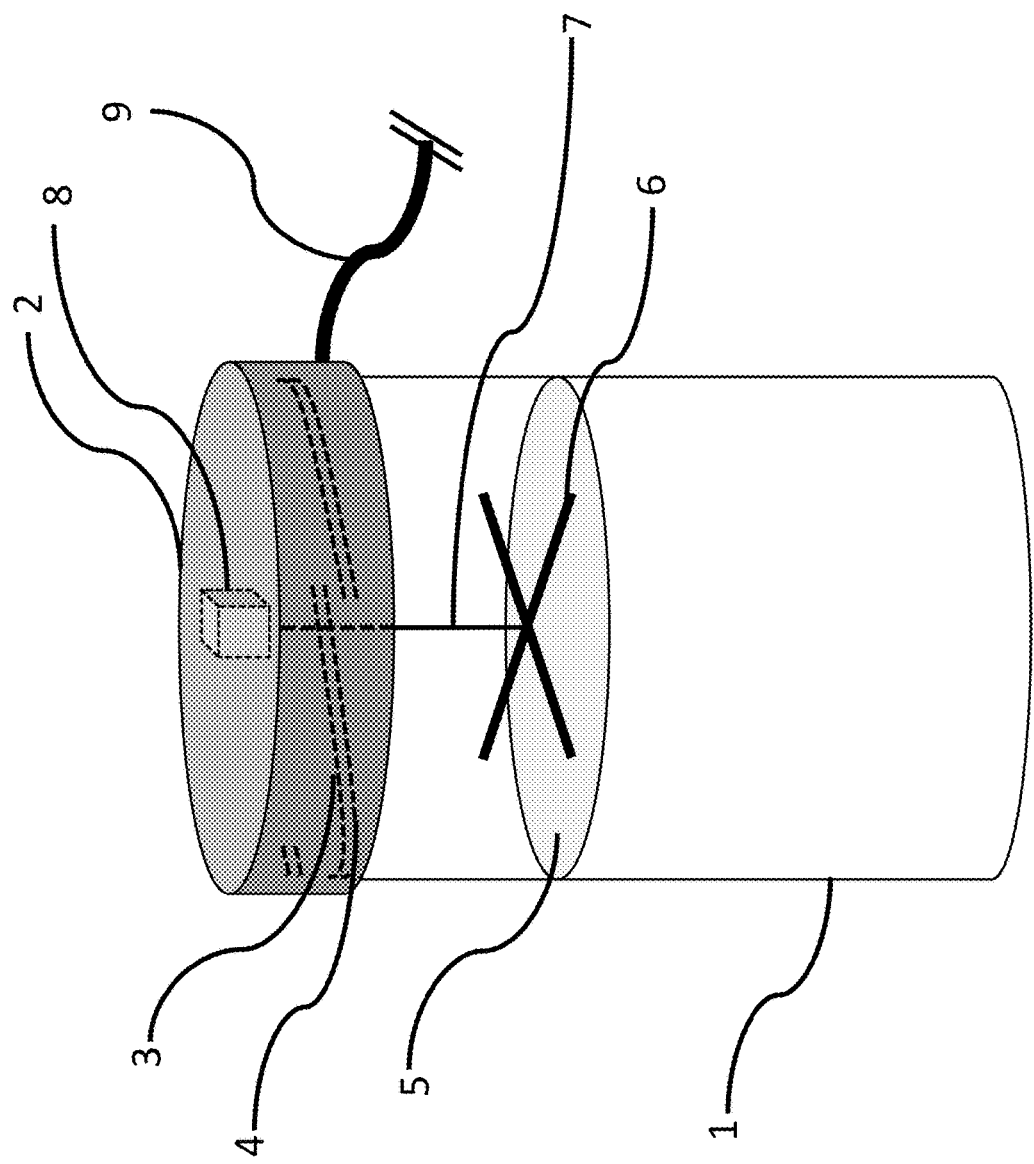
FIG. 2 is a drawing of an alternative embodiment of the invention.

In the embodiment shown in FIG. 2, the motor 8, the power source 9, the axel 7, and the pitched bladed propeller 6 are incorporated into the removable top 2. In this embodiment, the porous mesh screen 5, is placed below the propeller 6. This embodiment is operated in a fashion similar to the embodiment shown in FIG. 1, except that the brewing solid is restricted to that portion of the internal volume of the brewing vessel 1 that is below the porous mesh screen 5.

Figure 3:
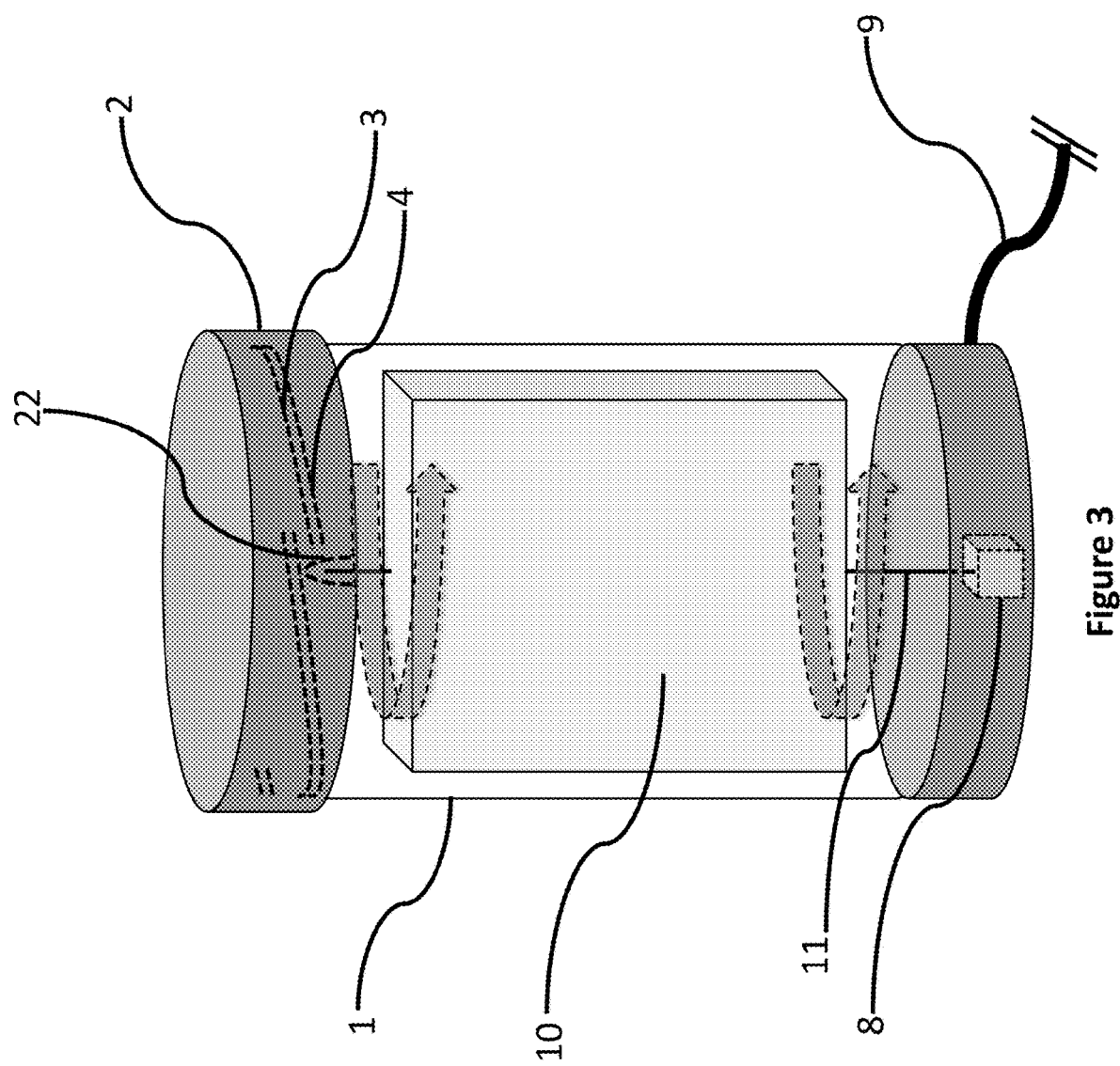
FIG. 3 is a drawing of an alternative embodiment of the invention.

The embodiment shown in FIG. 3 shares many elements with the embodiments shown in FIGS. 1 and 2, but also features some differences. In the embodiment shown in FIG. 3, a porous mesh chamber 10 is connected to an axel 11, which axel 11 is in turn connected to a motor 8 in the base of the brewing vessel 1. The motor is powered by an electrical power source 9. The brewing solid is placed inside the porous mesh chamber 10, which may be sealed by snapping one of the faces of the chamber onto the remaining portion of the chamber or by placing one of faces of the chamber on hinges so that the face can be swung shut against the remainder of the chamber and sealed with one or more clasps. The brewing solvent is poured into the brewing vessel 1. The sealed porous mesh chamber 10 containing the brewing solid is connected to the axel 11. The axel 11 may extend from both the top and the bottom of the porous mesh chamber 10, in which case the top of the axel 11 can be secured in a receiving notch 22 on the underside of the removable top 2. The removable top 2 is secured to the brewing vessel 1 by screwing the threaded grooves 3 of the brewing vessel 1 together with the threaded grooves 4 of the removable top 2. When the motor 8 is activated, the porous mesh chamber 10 spins, and the brewing solvent flows through the pours of the porous mesh chamber 10, mixing with the brewing solid. After the desired brewing time has elapsed, the motor 8 is deactivated, the porous mesh chamber 10 containing the brewing solid is removed, and the brewed beverage remains in the brewing vessel 1.

Figure 4:
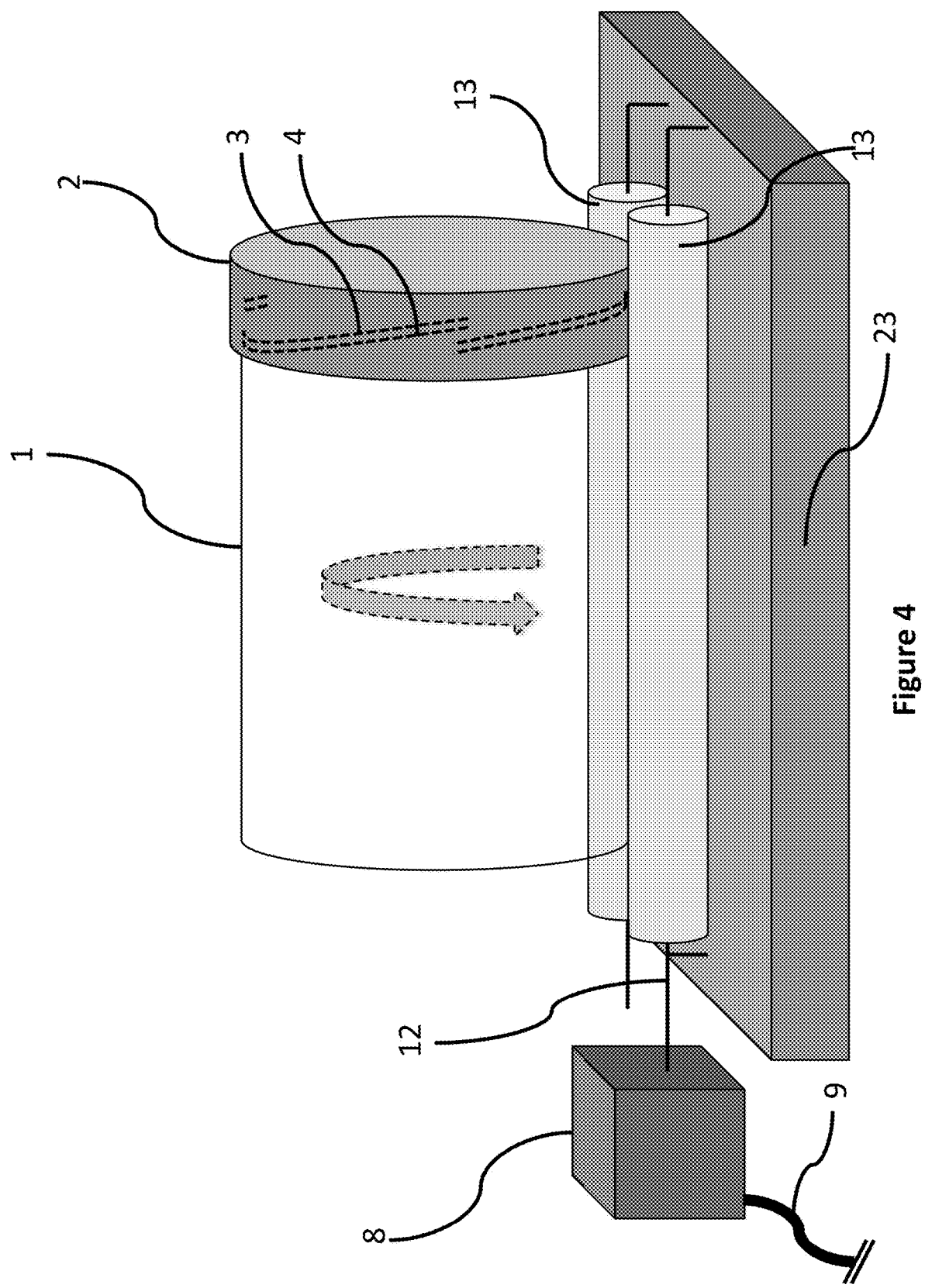
FIG. 4 is a drawing of an alternative embodiment of the invention.

The embodiment shown in FIG. 4 adds physical motion to the brewing extraction by rolling or tumbling the brewing vessel 1. The embodiment shown in FIG. 4 is operated as follows: the brewing solid and the brewing solvent are placed inside the brewing vessel 1. The removable top 2 is secured to the brewing vessel 1 by screwing the threaded grooves 3 of the brewing vessel 1 together with the threaded grooves 4 of the removable top 2. The sealed brewing vessel 1 is then laid on its side atop rollers 13, one or more of which are connected to an axel 12, which is in turn connected to a motor 8 powered by a power source 9. The rollers 13 are seated atop a base 23. When the motor 8 is activated, the sealed brewing vessel 1 spins in place atop the rollers 13, which spinning action mixes the brewing solid and brewing solvent. After the desired brewing time has elapsed, the motor 8 is deactivated and the brewed beverage can be separated from the brewing solid. In an alternative embodiment, the axel 12 may be attached to one or more ends of the brewing vessel 1 or the removable top 2, rather than to one or more of the rollers 13.

The embodiment shown in FIG. 5 circulates the brewing solvent to add physical motion to the brewing extraction as follows: the brewing solid is placed inside a porous mesh chamber 10, which may optionally be supported by an axel or rod 11. (If the optional axel or rod 11 is used, it can be secured in a receiving notch 22 on the underside of the removable top 2 or on the bottom of the brewing vessel 1.) The removable top 2 may be affixed to the brewing vessel 1 by screwing the threaded grooves 3 and 4 together. In this embodiment, the brewing vessel 1 features one or more inlet holes 18 and one or more outlet holes 16. Each outlet hole 16 is connected to an outlet tube 15 that is connected to the inlet of a pump 14 that is powered by a power source 9. The outlet of the pump 14 is connected to a tube 17 that is connected to each inlet hole 18. When the pump 14 is activated, the brewing solvent is circulated through the brewing vessel 1. The brewing solvent flows through the porous mesh chamber 10, coming into contact with the brewing solid, but the brewing solid remains in the porous mesh chamber 10. After the desired brewing time has elapsed, the pump 14 is deactivated and the porous mesh chamber 10 is removed from the brewed beverage.

Figure 7:
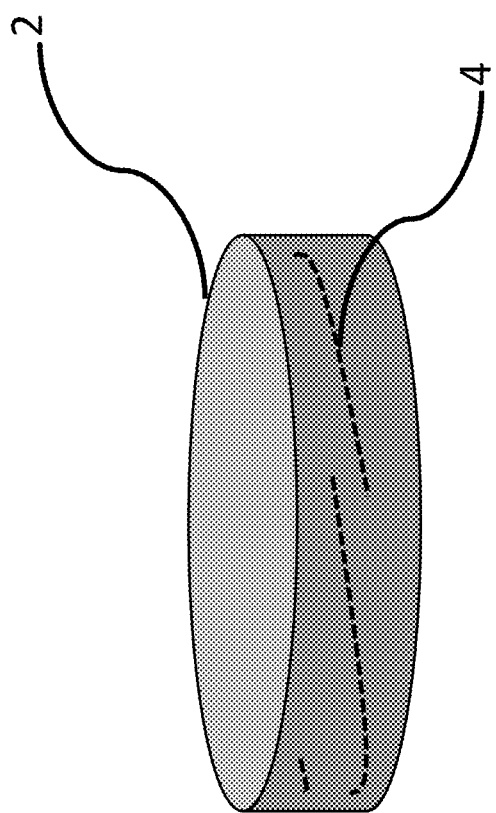
FIG. 7 is a drawing of a portion of an embodiment of the invention, which portion is a top that screws onto the vessel of FIG. 6.

FIG. 7 shows a side view of an embodiment of the removable top 2, removed from other elements of the invention. FIG. 7 also shows threaded grooves 4 that are complementary to the threaded grooves 3 integrated into certain embodiments of the brewing vessel 1.

Figure 8:
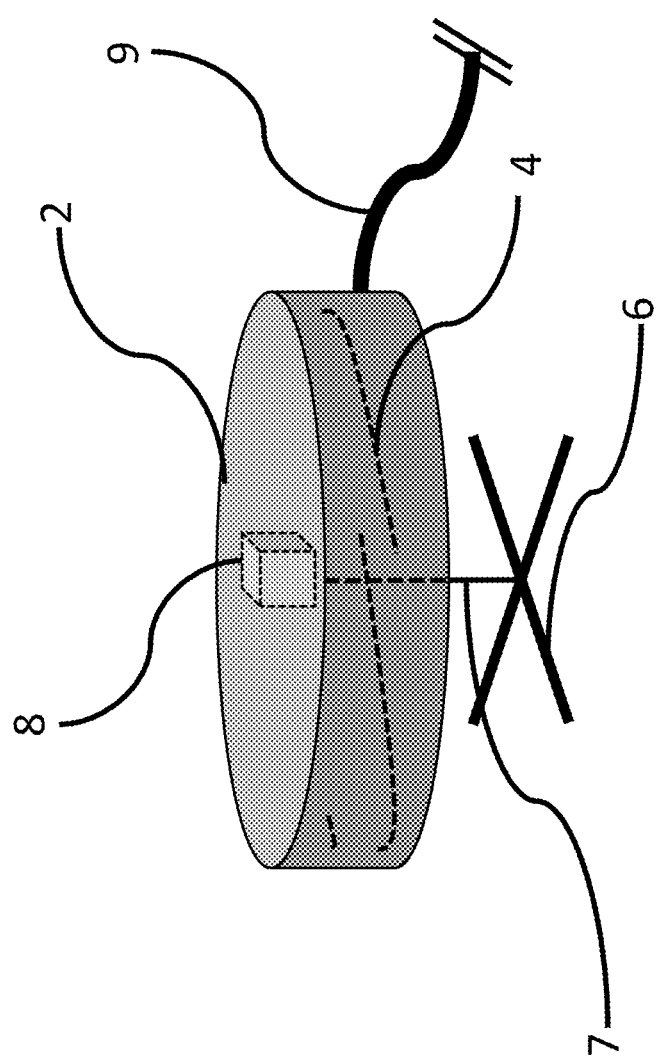
FIG. 8 is a drawing of a portion of an embodiment of the invention, which portion is a top that screws onto the vessel of FIG. 6, which top features a pitched bladed propeller attached to an axel and motor, which spins to stir the solution in the vessel.
Figure 9:
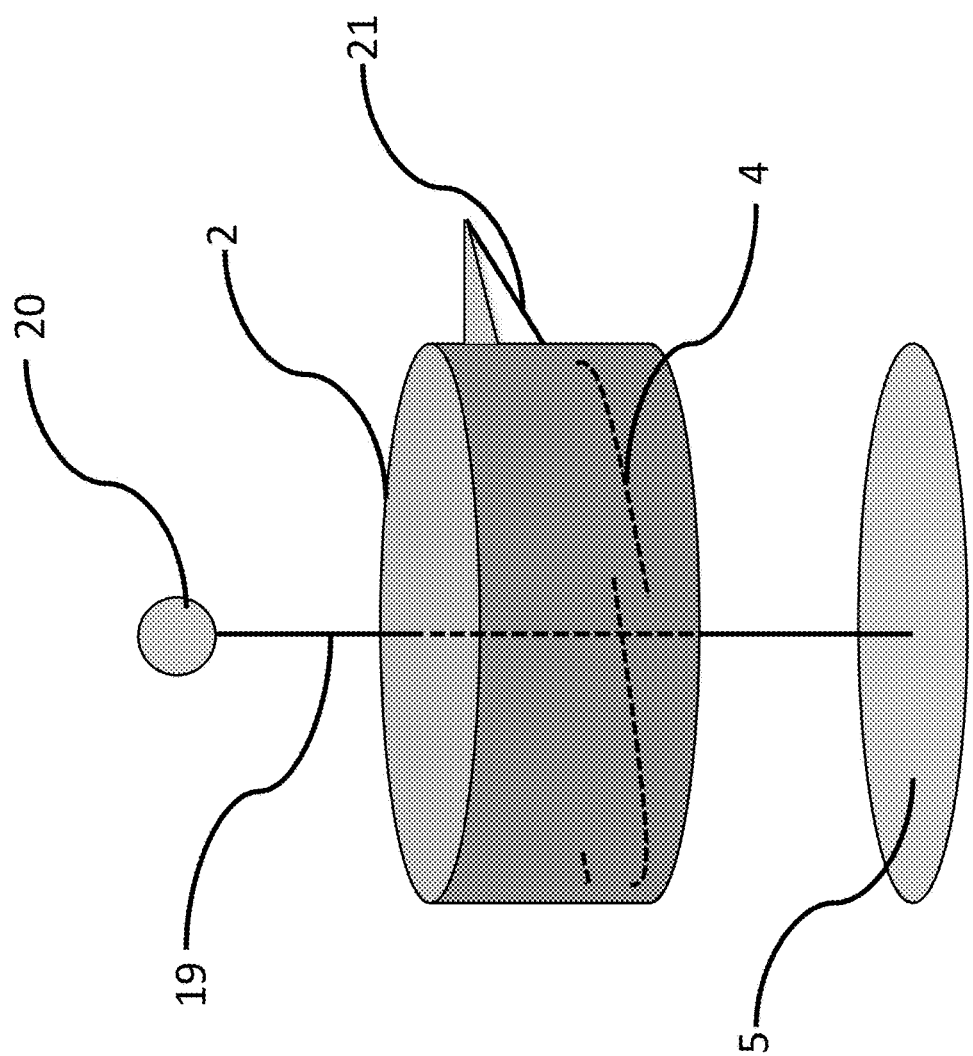
FIG. 9 is a drawing of a portion of an embodiment of the invention, which portion is a top that screws onto the vessel of FIG. 6, which top features a mesh screen attached to a plunger and a spout.

FIG. 8 shows a side view on another embodiment of a removable top 2, removed from other elements of the invention, which embodiment is the removable top 2 that is also illustrated in FIG. 2. This embodiment features the integrated motor 8, power source 9, axel 7, pitched bladed propeller 6, and threaded grooves 4 described above, FIG. 9 shows a side view on another embodiment of a removable top 2, removed from other elements of the invention. The embodiment shown in FIG. 9 features a porous mesh screen 5 attached to a plunger rod 19 with a handle 20. When this embodiment of the removable top 2 is attached to the brewing vessel 1, in this embodiment by screwing the threaded grooves 3 and 4 together, the plunger rod 19 and handle 20 can be depressed, forcing the porous mesh screen 5 downward through the brewing vessel 1, thereby pressing the brewing solid down while the brewing solvent or brewed beverage flows through the porous mesh screen 5. In this way, this embodiment of the removable top 2 can be used to separate the brewed beverage from the brewing solid after the brewing extraction is complete. The embodiment of the removable top 2 shown in FIG. 9 also features a spout 21, through which the brewed beverage may be poured from the brewing vessel 1.

What is claimed:

1. A device for use in brewing coffee or tea, or otherwise extracting compounds from solids into a liquid solvent, by application of physical motion by the device, and to decrease the time necessary to accomplish such brewing or extraction compared to brewing or extraction in the absence of applied physical motion, without the necessity of thermal energy being added to the liquid solvent during, or prior to, the brewing or extraction and without shearing, grinding or pulverizing the coffee, tea, or other solid from which one or more compounds are to be extracted, wherein such device features a vessel containing the solvent in combination with the coffee, tea, or other solid from which one or more compounds are to be extracted and further features a multiplicity of interchangeable ends or tops that can be affixed to the vessel and wherein certain of the interchangeable ends or tops are designed to seal the vessel shut to prevent leakage or spillage of liquid.

2. A device for use in brewing coffee or tea, or otherwise extracting compounds from solids into a liquid solvent, by application of physical motion by the device, and to decrease the time necessary to accomplish such brewing or extraction compared to brewing or extraction in the absence of applied physical motion, without the necessity of thermal energy being added to the liquid solvent during, or prior to, the brewing or extraction and without shearing, grinding or pulverizing the coffee, tea, or other solid from which one or more compounds are to be extracted, wherein such device features a vessel containing the solvent in combination with the coffee, tea, or other solid from which one or more compounds are to be extracted and further features a multiplicity of interchangeable ends or tops that can be affixed to the vessel and wherein certain of the interchangeable ends or tops feature a spout or other channel that allows liquid to be poured from the device.

3. A device for use in brewing coffee or tea, or otherwise extracting compounds from solids into a liquid solvent, by application of physical motion by the device, and to decrease the time necessary to accomplish such brewing or extraction compared to brewing or extraction in the absence of applied physical motion, without the necessity of thermal energy being added to the liquid solvent during, or prior to, the brewing or extraction, wherein such device features a vessel containing the solvent in combination with the coffee, tea, or other solid from which one or more compounds are to be extracted, the exterior of which vessel is cylindrical, and wherein said device further features one or more rollers upon which the cylindrical vessel can be laid on its rounded side.

4. The device described in claim 3, wherein the roller or rollers spin in such a way as to roll or tumble the vessel.

5. A device for use in brewing coffee or tea, or otherwise extracting compounds from solids into a liquid solvent, by application of physical motion by the device, and to decrease the time necessary to accomplish such brewing or extraction compared to brewing or extraction in the absence of applied physical motion, without the necessity of thermal energy being added to the liquid solvent during, or prior to, the brewing or extraction and without shearing, grinding or pulverizing the coffee, tea, or other solid from which one or more compounds are to be extracted, wherein the coffee, tea, or other solid from which one or more compounds are to be extracted is contained within a porous chamber, through which the solvent can flow and wherein the solvent is caused to flow through the porous chamber by means of a pump.

\* \* \* \* \*